April 22, 1924.

W. M. PETTIT

TUFT MAKING MACHINE

Filed Jan. 17, 1922

1,491,062

7 Sheets-Sheet 3

Inventor
Wilson M. Pettit
by Geiger & Popp
Attorneys

April 22, 1924.
W. M. PETTIT
1,491,062
TUFT MAKING MACHINE
Filed Jan. 17, 1922    7 Sheets-Sheet 5
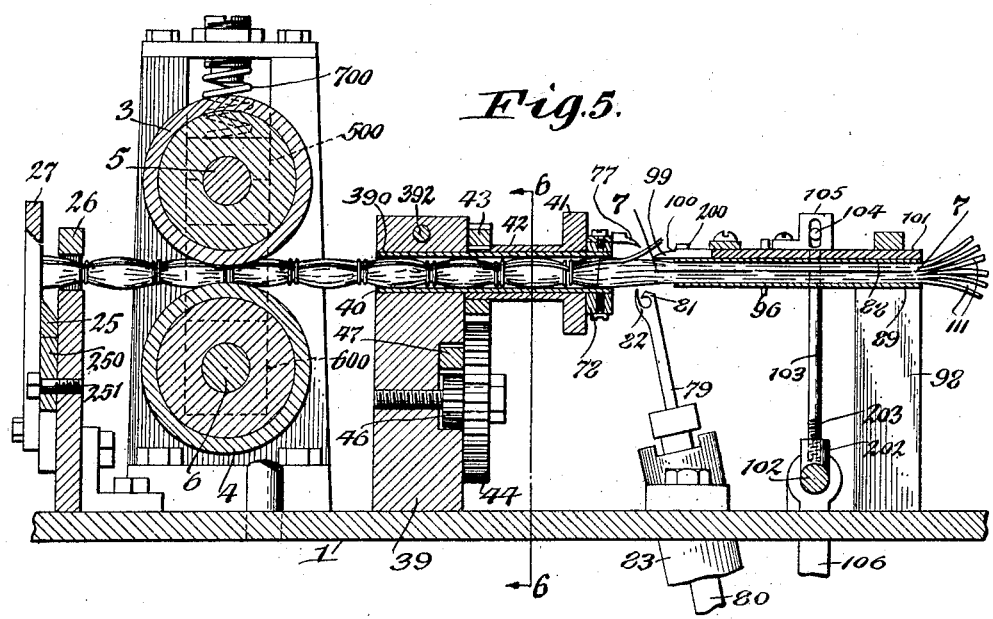
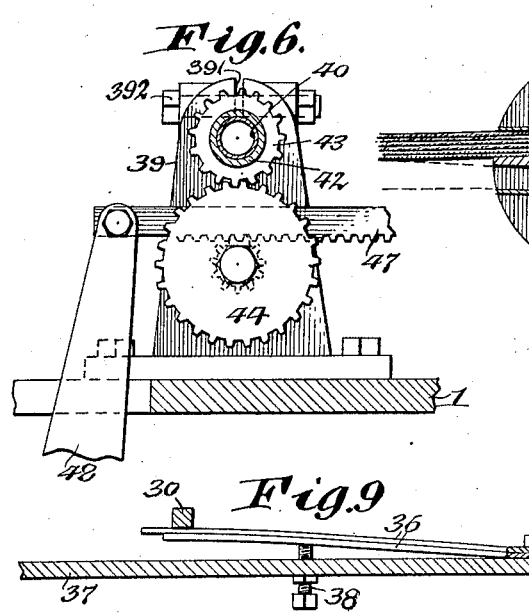
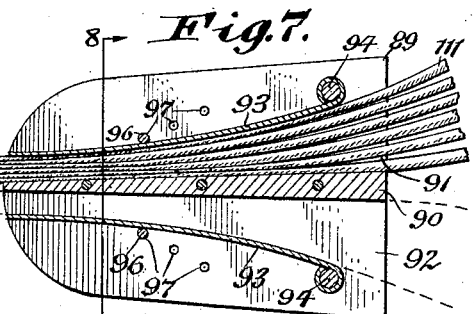
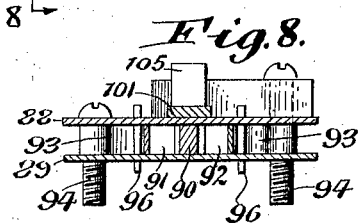

April 22, 1924.

W. M. PETTIT

TUFT MAKING MACHINE

Filed Jan. 17, 1922  7 Sheets-Sheet 7

1,491,062

Inventor
Wilson M. Pettit
by Leeper & Popp
Attorneys

Patented Apr. 22, 1924.

1,491,062

UNITED STATES PATENT OFFICE.

WILSON M. PETTIT, OF LOCKPORT, NEW YORK.

TUFT-MAKING MACHINE.

Application filed January 17, 1922. Serial No. 529,949.

*To all whom it may concern:*

Be it known that I, WILSON M. PETTIT, a citizen of the United States, residing in Lockport, in the county of Niagara and State of New York, have invented new and useful Improvements in Tuft-Making Machines, of which the following is a specification.

This invention relates to a machine for making tufts for use in upholstery and more particularly to a machine similar to that shown in Letters Patent of the United States No. 1,200,838 dated October 10, 1916.

The objects of this invention are to improve the construction of the driving mechanism so as to avoid undue strain and distortion thereof and inaccuracy in the timing of the working parts, also to provide means for readily changing the gearing so as to permit of making tufts of different length; also to so construct and mount the cam shaft that the same may be readily removed from the machine without dismantling adjacent parts when access is required to this shaft and the parts operated by the same; also to so construct and mount the spring which holds the blades of the tuft cutter together that the same operates more efficiently and is not liable to break; also to so mount the lever which operates the gears of the winding or twisting mechanism that the throw of this lever may be readily adjusted to take up wear on these gears and cause the same to operate at the proper time; also to provide means which permits the winding or twisting mechanism to be automatically disengaged from the power operated parts of the machine when this mechanism becomes clogged and thus avoid breaking any of the parts; also to improve the means for guiding the thread from the source of supply to the twisting mechanism; also to provide means for preventing the thread from becoming caught in the tuft rope feeding rollers; also to prevent the thread from becoming caught on the elevated thread guide; also to improve the means for connecting the horn shifting arm with its rockshaft; also to provide simple means for taking up the wear on the tuft cutter when the same is sharpened; also to improve the means for holding the tubular guide through which the yarn rope moves; also to improve the means for actuating the tucking needle; also to improve the construction of the deflector fork; and also to improve the means for driving the yarn rope feed rollers.

Figure 1:
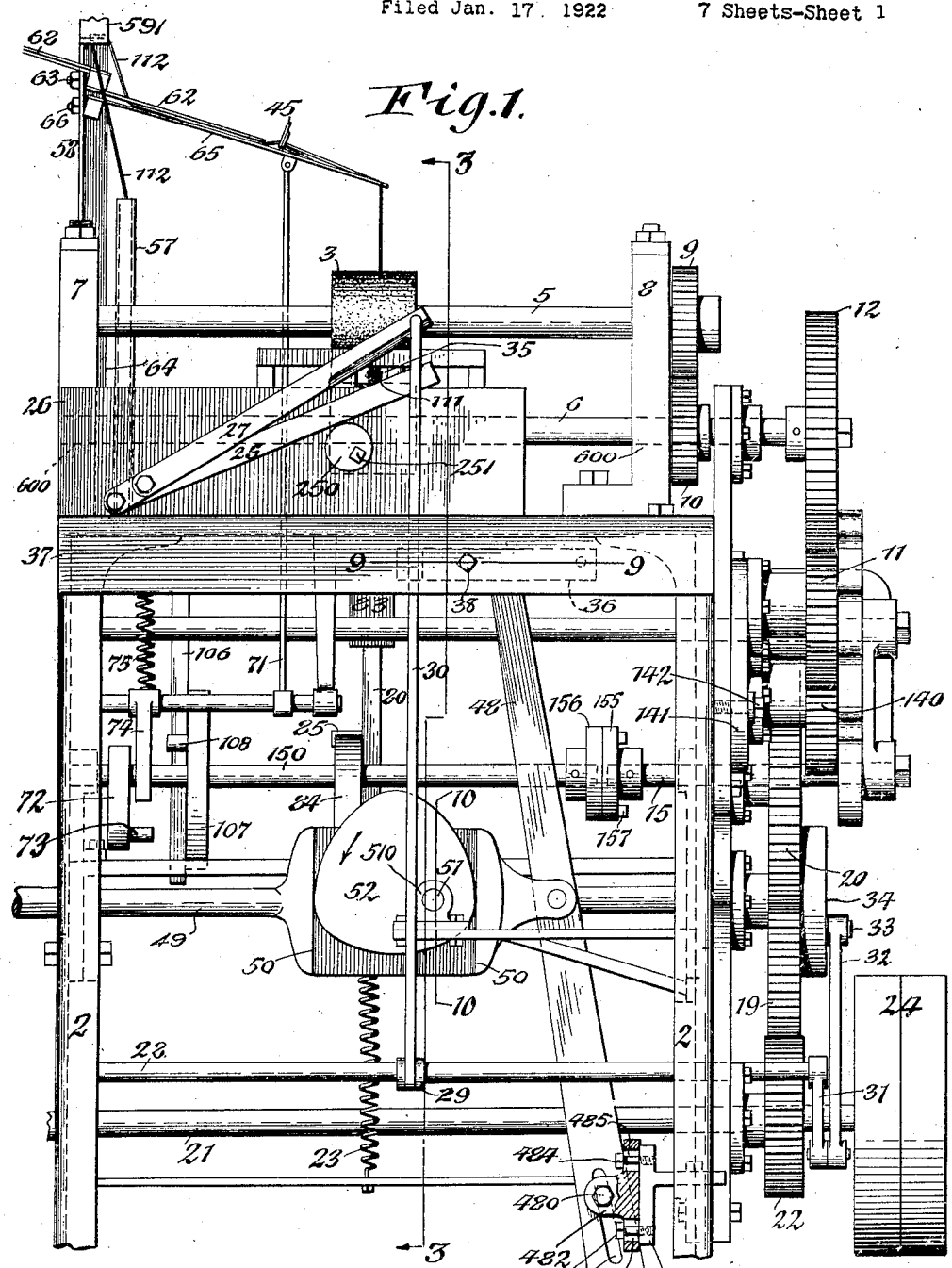
Figure 2:
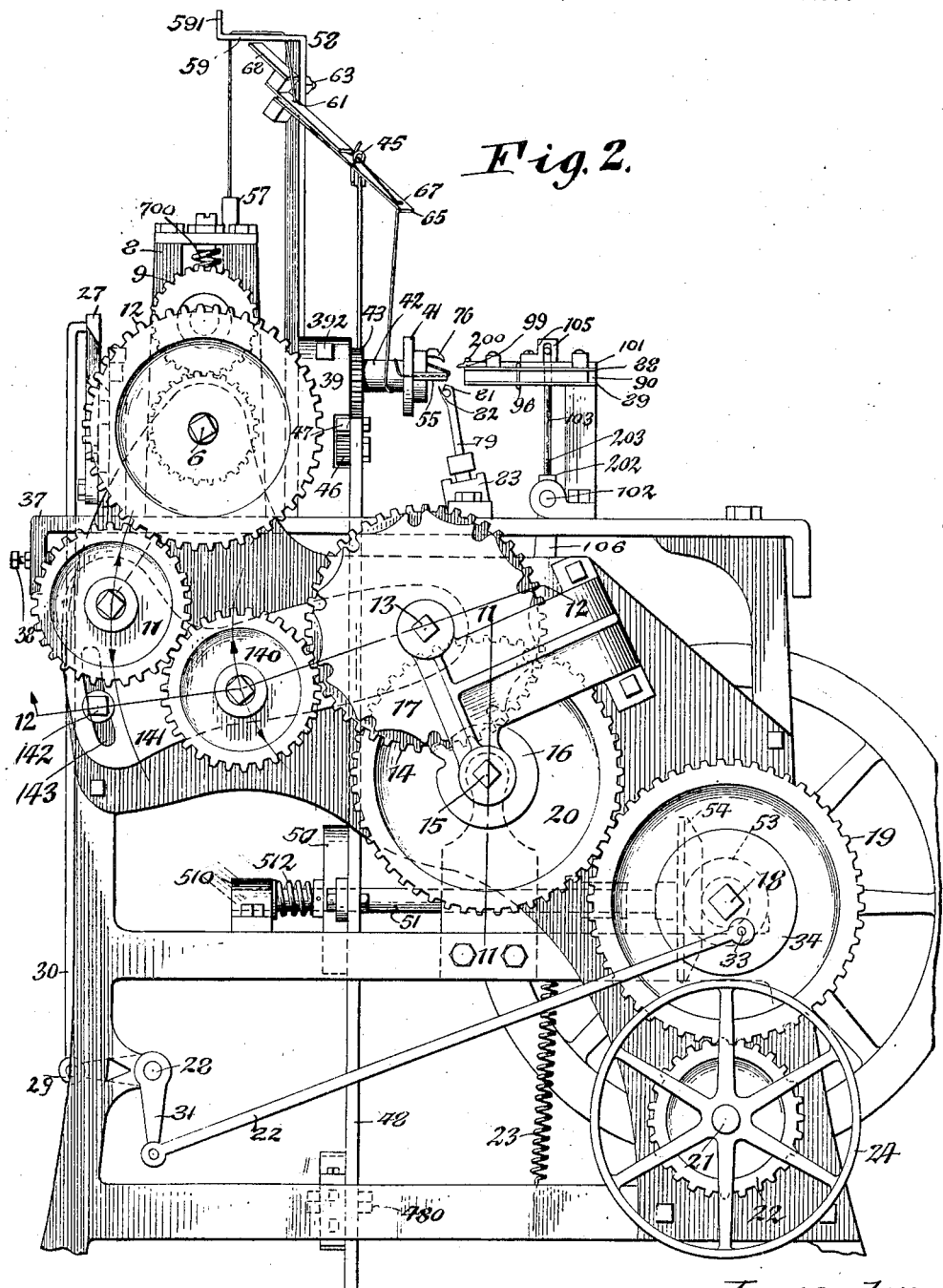
Figure 3:
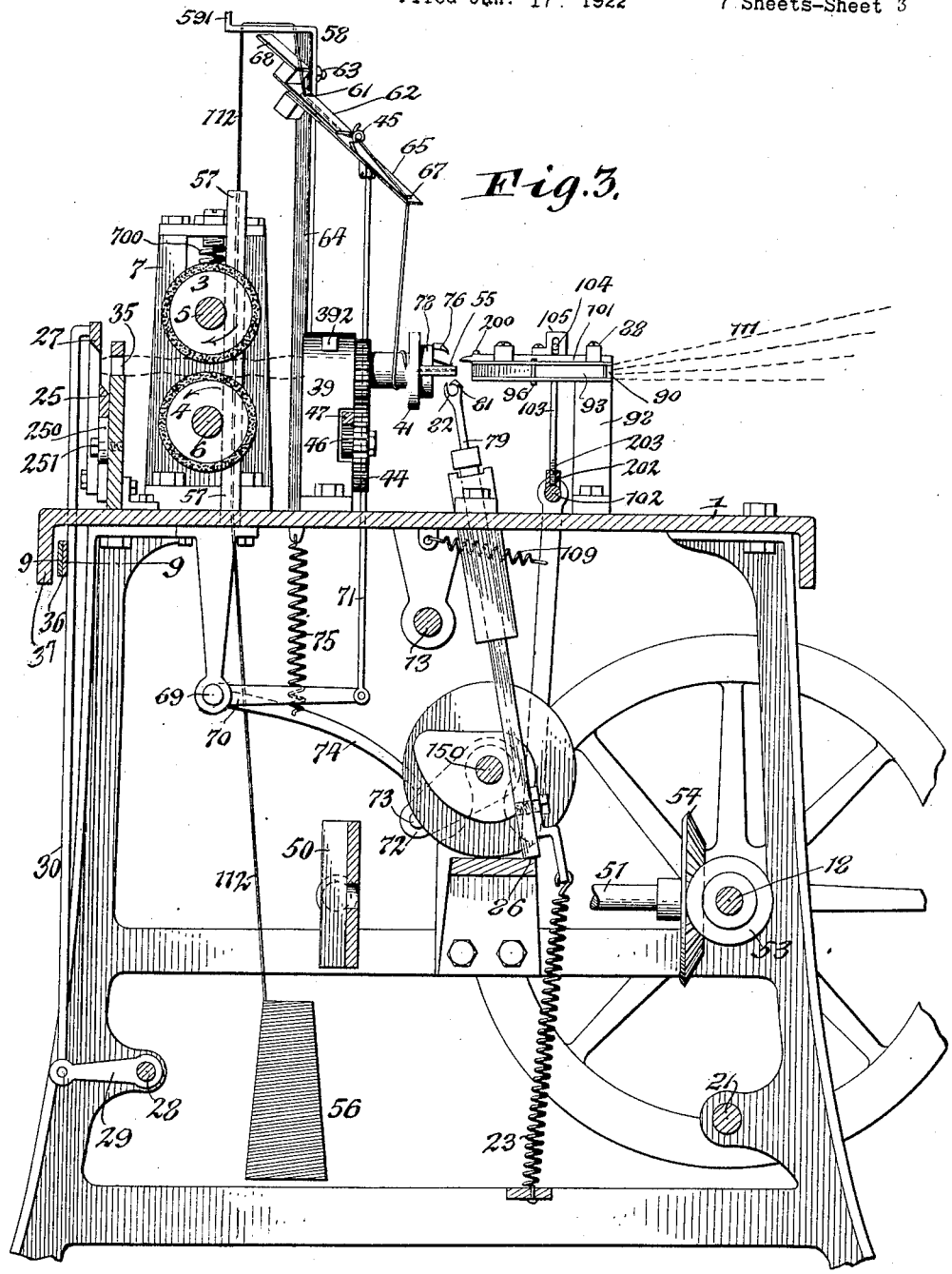
Figure 4:
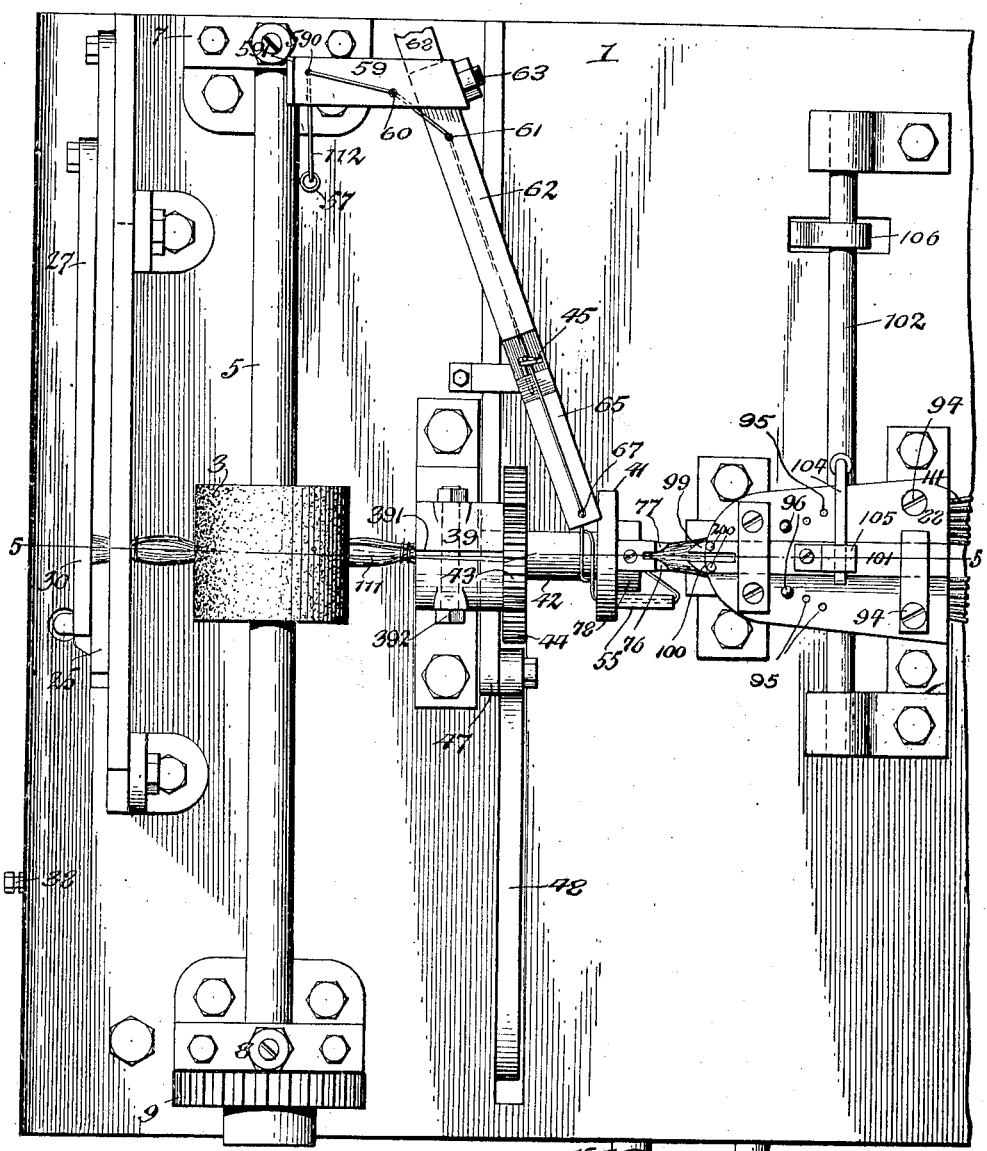
Figure 10:
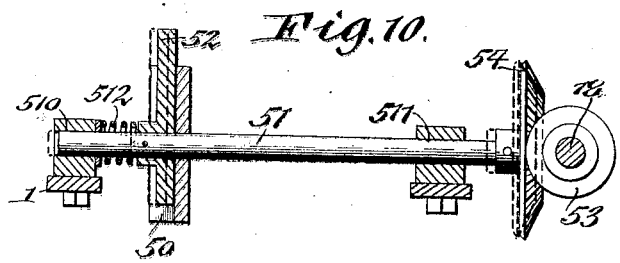
Figure 11:
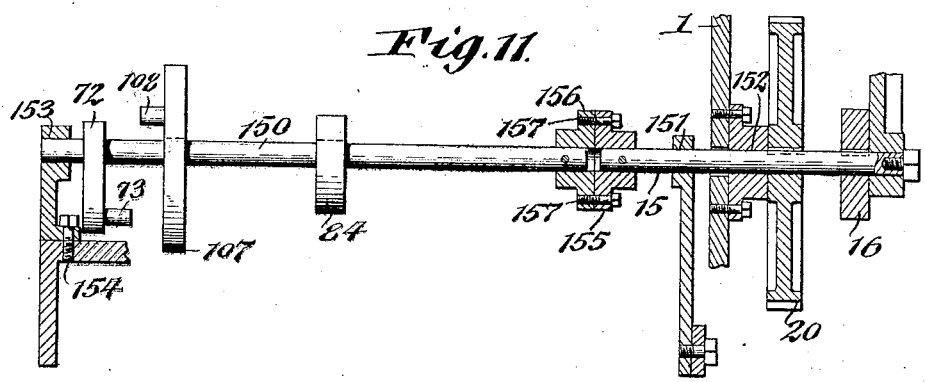
Figure 12:
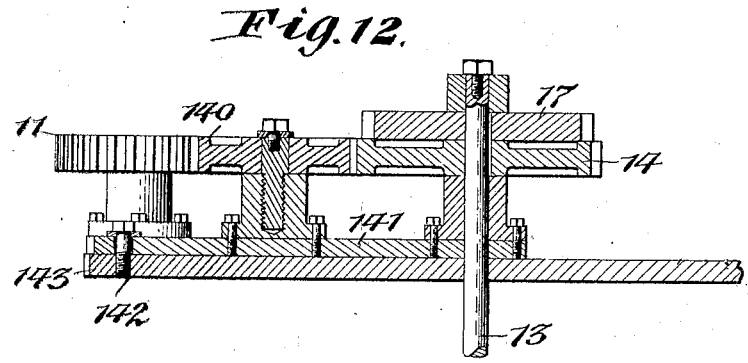
Figure 13:
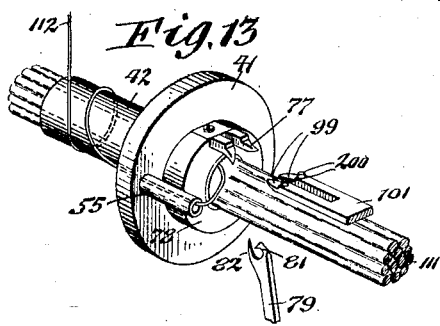
Figure 20:
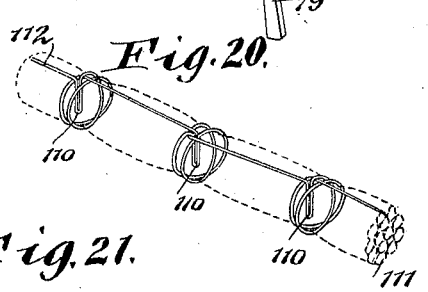
Figure 21:

In the accompanying drawings: Figure 1 is a front elevation of a tuft making machine embodying my invention. Figure 2 is an end elevation thereof viewed from the right. Figure 3 is a vertical longitudinal section taken on line 3—3, Fig. 1. Figure 4 is a top plan view of the machine. Figure 5 is a fragmentary vertical longitudinal section, on an enlarged scale, taken on line 5—5, Fig. 4. Figure 6 is a vertical transverse section taken on line 6—6, Fig. 5. Figure 7 is a fragmentary horizontal section, on a still larger scale, taken on line 7—7, Fig. 5. Figure 8 is a vertical transverse section taken on line 8—8, Fig. 7. Figure 9 is a fragmentary horizontal section taken on line 9—9, Fig. 3. Figure 10 is a fragmentary vertical section on line 10—10, Fig. 1. Figure 11 is a vertical section taken on line 11—11, Fig. 2. Figure 12 is a horizontal section taken on line 12—12, Fig. 2. Figures 13-19 are fragmentary perspective views showing different positions of the tuft binding mechanism. Figure 20 is a similar view showing the manner in which a succession of windings of the binding thread are applied to the yarn rope. Figure 21 is a perspective view of one of the completed tufts produced by this machine.

Similar characters of reference refer to like parts throughout the several views.

The main frame of this machine which supports the working parts may be of any suitable construction, that shown in the drawings comprising a horizontal table or top plate 1, and uprights or standards 2, 2 supporting opposite ends of the table.

In its general organization the working parts of this machine comprise the following main elements viz: a feeder whereby the strands of yarn 111 from which the tufts are made are drawn through the machine while gathered in the form of a rope, a winder or twister which operates to wind or twist a binding thread or cord 112 at intervals around the rope of yarn, a needle or hook whereby the binding thread 112 is tucked into the body of the rope for preventing the thread from becoming loose, a guide whereby the several strands of yarn are directed to the winder and gathered in the form of a rope, and a cutter which operates to cut the yarn of rope at intervals between the windings of threads on the same.

The feeding device preferably comprises two rollers 3, 4 which are arranged one above the other and mounted on horizontal upper driven and lower driving shafts 5, 6 which are journaled in suitable bearings arranged on standards 7, 8 rising from the front part of the table. These feed rollers are operated so that their opposing sides move forwardly and cause the rope of yarn which is engaged on its opposite sides by these rollers to move forwardly. Means are provided for causing these rollers to turn in unison and intermittently so that the rope of yarn is advanced step by step with an interval of rest between successive steps. The preferred means for thus operating the feed rollers which are shown in the drawings comprise a pair of co-operating gear wheels 9, 10 which are secured respectively to the shafts of the feed rollers, an upper intermediate gear wheel 11 meshing with a driven pinion 12 on the shaft 6 of the lower feed wheel 10, an intermediate shaft 13 journaled in suitable bearings on the main frame and provided with a driving gear wheel 14, a lower intermediate gear wheel 140 meshing on its opposite sides with the gear wheels 14 and 11, and an operating or cam shaft 15, 150, journaled in suitable bearings on the main frame and provided with a Geneva or intermittent stop pinion 16 which meshes with a Geneva or intermittent stop wheel 17 on the intermediate shaft 13. The operating shaft 15, 150 makes one rotation for each operation of the machine and the relative timing of the pinions and wheels which transmit the movement from the operating shaft to the feed wheels is such that the latter are caused to feed the yarn rope 111 forward at each step a distance equal to the length of a tuft and then remain at rest before beginning the next step a sufficient length of time to permit a binding thread 112 to be applied to the rope of yarn by the mechanism provided for this purpose and the cutting mechanism to sever a completed tuft from the front or advancing end of the yarn rope.

The lower driving shaft 6 is journaled in bearings 600 fixed on the standards 7, 8 of the main frame and incapable of vertical movement so that the bodily position of the gear wheel 10 on the same relative to the gear wheel 9 does not change, but the upper driven shaft 5 is journaled in bearings 500 which are movable vertically on the standards 7, 8 and are yieldingly held in a depressed position by springs 700 so that the upper feed roller 3 can rise and fall and adapt itself to any variation in the thickness of the yarn rope while the driven gear wheel 9 of the upper feed roller shaft remains in driving connection with the driving gear wheel 10 of the lower shaft 6.

For the purpose of varying the feeding effect of the rollers 3, 4, and thus lengthen or shorten the tufts provided by the machine means are provided for changing the relative speed of the shafts 15 and 6. This is preferably accomplished by selecting a gear 12 of the desired size and then shifting the gears 11 and 140 so as to fit the gears 12 and 14. In the construction shown in Figs. 1, 2 and 12 the gears 11 and 140 are for this purpose pivotally mounted on a vertically swinging arm 141 which turns at one end about the axis of the shaft 13 while its opposite end is adjustably connected with the adjacent part of this main frame by a bolt 142 passing through a slot 143 arranged in the supporting arm and curved concentrically with the axis thereof. By this means a removable gear wheel 12 may be employed which can be interchanged with one of different diameter and the gear 11 engaged therewith by lowering or raising the adjustable supporting arm 141 and then clamping the latter in place on the frame.

Any suitable means may be provided for continuously turning the operating or cam shaft 15, 150 at the proper speeds those shown in Figs. 1, 2 and 3 of the drawings comprising a horizontal transverse counter shaft 18 journaled in suitable bearings on the rear part of the main frame and operatively connected with the operating shaft 15, 150 by means of a pair of intermeshing gear wheels 19, 20 secured to corresponding ends of the counter and operating shafts, and a driving shaft 21 journaled transversely and horizontally in suitable bearings on the lower rear part of the main frame and provided with a pinion 22 meshing with a driven gear wheel 19 on the counter shaft and with a driving pulley 24 adapted to receive a driving belt whereby power from any suitable source may be transmitted to the driving shaft.

Various means may be employed for severing the rope of yarn at intervals between the places where the binding thread is applied to the same. The preferred means for this purpose shown in Figs. 1, 2, 3, 4 and 5 of the drawings comprise a lower stationary cutting blade 25 mounted on an upright bracket 26 rising from the front part of the table in front of the feed rollers, an upper movable cutting blade 27 co-operating with the lower blade and pivoted at one end for vertical oscillation to said bracket, a cutter rock shaft 28 journaled transversely and horizontally in suitable bearings on the lower front part of the frame, an upper rock arm 29 projecting forwardly from the cutter shaft and connected by an upright rod 30 with the free end of the movable blade, a lower rock arm 31 depending from the cutter shaft and a connecting rod 32 connected at its front end with the lower rock arm 31 while its rear end is connected with a crank pin 33 on a disk 34 secured to the corresponding end of the counter shaft 18. The counter shaft 18 also makes one turn for each operation of the machine and the movement of the parts whereby motion is transmitted from this shaft to the movable cutter blade is so timed that the two cutter blades are separated while the feed wheels are in motion and permit the latter to move the front end of the yarn rope between the cutter blades and after the forward movement of each step of the feed wheels has been completed and the yarn rope is at rest the movable blade descends and cooperates with the lower blade so that the yarn rope is severed midway between the foremost winding of the thread and the next following winding of the same whereby a completed tuft at the front end of the rope of yarn is severed therefrom.

The bracket 26 is preferably provided with a guideway 35 which is in line or substantially so with the space between the feed rollers and the space between the cutting blades in the separated position of the latter which guideway receives the yarn rope and directs the same from the feed rollers to the cutter blades.

For the purpose of causing the movable cutter blade to always bear firmly sidewise against the stationary blade and also to take up any wear between the same so as to insure perfect severing of the tufts from the yarn rope, a tension device is provided which preferably consists of a leaf spring 36 preferably made up of a plurality of sections and bearing with its free end against the front side of the connecting rod 30 below the table and connected at its opposite end to a depending flange 37 on this part of the table while its intermediate part is engaged by an adjusting screw 38 which is mounted on said flange. Upon turning this screw in the proper direction the tension upon the spring 36 may be adjusted for causing the movable cutter blade to bear laterally with the desired pressure against the side of the stationary blade.

These means of exerting lateral pressure against the connecting rod 30 causes the flat sides of the cutter blades 27, 25 to always remain in firm contact with each other and insure a clean and perfect cut of the yarn rope into sections and prevents any vibration or whipping action of the rod 30 from interfering with the operation of this cutter.

When the upper or cutting edge of the lower or fixed blade 25 becomes worn by sharpening the same is raised to bring it up to the proper position relative to the path of the yarn rope for severing the latter. This adjustment is effected by a vertically swinging cam 250 which is pivoted by a screw 251 on the outer side of the bracket 26 and engages the lower edge of the lower or normally fixed blade 25. By loosening the screw 251 and turning the cam 250 the cutter blade 25 may be adjusted vertically as required and then held in place by again tightening the pivot screw 251.

The mechanism whereby the thread is wound at intervals around the rope of yarn is arranged in rear of the feed rollers and is constructed as follows:

39 represents the stationary bracket mounted on the table in rear of the feed rollers and provided at its upper end with an opening 390 in which is secured a stationary tube 40 which is arranged lengthwise and horizontally in line with the space between the feed rollers which receives the rope of yarn on its interior and guides the same to the feed rollers and which also forms a bearing and support on the exterior of its rear end for other parts of the binding mechanism which will be presently described.

This tube is preferably secured to the bracket 39 by splitting the latter lengthwise on its upper side, as shown at 391 in Fig. 4, and connecting the parts of this bracket on opposite sides of this split by a clamping bolt 392 so that upon tightening the latter the tube 40 will be gripped firmly and held in place frictionally without liability of the tube becoming indented internally and interfering with the free movement of the yarn rope through the same.

41 represents a rotatable winding disk or head mounted on the rear end of a tubular hub 42 which is journaled on the tubular guide bearing 40 in rear of the bracket 39. An intermittent rotary movement in opposite directions is imparted to this winding disk by means which preferably comprise a driven pinion 43 secured to the front end of the hub 42 in rear of the bracket 39, a gear wheel 44 pivoted on the lower rear part of the bracket 39 and meshing with the pinion 43, a driving pinion 46 turning with the gear wheel 44, a horizontally and transversely reciprocating gear rack 47 guided in suitable ways on the bracket 39 and the table and meshing with the upper side of the driving pinion 46, an upright rock lever 48 pivotally connected at its upper end with the gear rack and fulcrumed at its lower end on the lower part of the main frame so as to swing transversely in the machine, a shipper rod 49 guided at one end on the main frame and pivotally connected at its opposite end with a rock lever 48 and provided with two upright bearing faces 50, 50, a horizontal longitudinal shaft 51 journaled in suitable bearings on the main frame and provided at its front end with a cam 52 engaging with the bearing faces 50 of the shipper rod and a bevel pinion 53 mounted on the counter shaft and meshing with a bevel gear wheel 54 at the rear end of the winder shaft 51. The timing of this mechanism whereby motion is transmitted from the counter shaft to the winding disk is so constructed that during one operation of the machine the winding disk is turned approximately two and a half rotations in one direction for winding the thread around the adjacent part of the yarn rope, then remains at rest while the thread tucking, yarn feeding and cutting operations are performed, and then again rotates approximately two and a half rotations in the opposite direction during the next operation of the machine for effecting the winding of the thread around the next following part of the yarn rope, and so on, each stroke of the gear rack in one direction corresponding to a complete operation of the machine.

It has been found in practice that owing to wear on the gears 43, 44, rod 49 and rack 47 and the pivotal connections with the lever 48 and the parts associated therewith a readjustment of the parts is necessary in order to properly time the turning movement of the winding head 41. This adjustment is readily accomplished by varying the position of the fulcrum at the lower end of the lever 48 which, as shown in Fig. 1 consists of a pivot pin 480 arranged in a longitudinal slot 481 in the lower end of the lever 48 and is adjustable vertically relatively to the main frame by mounting this pivot on a head 482 which is adjustable vertically on a bracket 483 of the main frame by bolts 484 passing through vertical slots 485 in the head and entering openings in said bracket. Upon loosening the bolts 484 the pivot pin 480 of the lever 48 may be raised or lowered and the effective throw of this lever varied for causing the same to turn the winding head 41 the required extent and thus not only permit of properly timing the parts more readily when setting up the machine but also taking up the wear on the same when necessary.

In the event that the thread which is being wound by the head 41 becomes caught or clogged so as to interfere with the operation of the machine some of the delicate parts of the winding mechanism are liable to be broken or injured if no means are provided to prevent such an occurence. This is best accomplished by automatically disengaging the bevel gear wheels 54 and 53 when the winding mechanism offers an undue resistance upon becoming clogged or bound in any way. In the preferred construction the shaft 51 which carries the bevel gear wheel 54 is mounted so as to be capable of moving lengthwise in its bearings 510, 511 on the main frame and the same is yieldingly moved in the direction for engaging the gear wheel 54 with the gear wheel 53 by means of a spring 512 surrounding the shaft 51 and interposed between the cam 52 and the bearing 510, as best shown in Fig. 10. Normally the gears 54, 53, remain in mesh and transmit power from the shaft 18 to the shaft 51 and from the latter to the winding mechanism. But if the winding device should for any reason become stuck and offer undue resistance the pressure of the teeth of the bevel gear wheel 53 against those of the bevel gear wheel 54 will cause the latter to be deflected and moved with the shaft 51 away from the gear wheel 53 sufficient to disengage these wheels and thus prevent the transmission of power from the shaft 18 to the winding mechanism and avoiding breaking of the latter. Obviously the width of the guide face 50 of the yoke which is engaged by the cam 52 is sufficiently great to permit the requisite longitudinal movement of the shaft 51 without disengaging the cam 52 and said yoke.

The binding thread which is adapted to be wound at intervals around the rope of yarn for the purpose of holding the several strands of the completed tuft together when the same is severed from the rope, may be supplied in various ways to an eye 55 of tubular form projecting rearwardly from the winding disk on one side of its axis. As shown in the drawings, the thread is supplied from a spool or bobbin 56 arranged within the lower part of the frame and supported in any suitable manner and from this spool the thread passes upwardly through a stationary guide tube 57 arranged adjacent to the feed roller shaft, thence through an opening 590 in the free end of the horizontal arm 59 of a tension bracket 58 on the upper side of the table, thence horizontally over this arm 59 and downwardly through an opening 60 thereof, thence downwardly through an opening 61 formed in a flat upper tension spring 62 which is adjustably secured at one end by means of a bolt 63 to an upright 64 of said bracket, thence lengthwise along the underside of said upper tension spring toward the free end thereof and also lengthwise over the upper side of a lower flat tension spring 65 which is adjustably secured at its fixed end by means of a bolt 66 to the upright of said bracket, thence downwardly through an opening 67 at the free end of the lower tension spring, thence around the hub of the winding disk and thence rearwardly through the eye of the winder, and thence to the rope of yarn about which the thread is to be wound. The thread is drawn from the spool or bobbin, as required, by the rotative movement of the winder and while the thread is thus withdrawn from the spool a tension is placed upon the same so as to keep it taut between the eye of the winder and the yarn rope, this tension being due to the frictional resistance which the thread encounters as it turns the corners and changes the direction of its movement in passing through the eyes or openings of the bracket 64 and the openings of the tension springs, and the grip of these tension springs against opposite sides of the thread. By turning the bolts 63, 66 more or less on the upright of the tension bracket the frictional grip of the tension springs may be varied as required, the nuts of these bolts being tightened for holding the tension springs in position after adjustment. For the purpose of permitting a delicate adjustment of the grip of the tension springs on the thread the supporting bolt 63 of the upper spring is provided with a tail 68 which projects in a direction opposite to the upper tension spring. This tail may be rapped lightly for slightly shifting the upper tension spring until the desired pressure upon the thread is obtained.

By passing the thread through the lower guide tube which is arranged adjacent to the feed roller shaft and the thread upon becoming slack intermittently during the operation of the machine adjacent to these shafts is not liable to be wound around one or the other of the shafts and broken which otherwise would necessitate re-threading of the machine and thus unnecessarily interrupt its operation and reduce its output accordingly.

While the winding device is at rest and the rope of yarn is advanced by means of the feed rollers the tension upon the thread is reduced so as to prevent undoing of the thread which has just been applied to the yarn rope. For this purpose the lower tension spring is depressed out of engagement from the upper tension spring during the time that the yarn is moved forward and permitted to again rise into engagement with the upper tension spring, this being preferably effected by means of a horizontal tension rock shaft 69 journaled transversely in bearings on the upper front part of the frame and provided with a rearwardly projecting rock arm 70 which is connected by an upright rod 71 with the lower tension spring, a rotatable tappet arm 72 mounted on the operating shaft and provided with a tappet pin or cam 73 which engages with another rock arm 74 on the tension rock shaft for turning the same in a direction in which the lower tension spring is depressed, and a spring 75 connecting the rock arm 74 with the underside of the table and operating to turn the rock shaft 69 in the direction for raising the lower tension spring when the tappet 73 clears the rock arm 74. In order to confine the thread lengthwise between the free ends of the upper and lower tension springs and positively prevent the same from escaping when the thread is whipped or jerked, an eye 45 is mounted on the upper side of the lower tension spring and receives the adjacent part of the binding thread so as to retain the same in its proper place.

When the spring 65 of the tension device snaps back to restore the tension on the thread a slight whipping action occurs in the thread which is liable to throw the same around the free end of the arm 59 and cause the thread to become caught and broken. To avoid this a guard lug 591 is provided which projecting upwardly from the free end of the arm 59 keeps the threads from getting around this arm and becoming broken.

In rear of the winding disk and preferably on the upper side of the path of the yarn rope and within the circular path of the eye of the winder are arranged two rearwardly projecting retaining horns 76, 77 upon one or the other of which the binding thread is supported during part of the operation of applying the thread to the yarn rope. These horns are stationary and are preferably supported side by side on a collar 78 which is mounted on the rear end of the stationary tubular guide and bearing 40, as shown in Figs. 2, 3, 4 and 5.

The tucking needles whereby a part of the binding thread or cord is tucked or drawn into the body or between the strands of the rope for the purpose of preventing the tuft from subsequently becoming loose or unraveled comprises an upright shank 79 secured to the upper end of a needle bar or slide 80 and provided at its upper end with a bill or hook 81 which projects from the rear edge or side of the needle shank forwardly and downwardly and a guard or beard 82 projecting from the front edge or side of the needle shank upwardly in front of the point of the bill or hook and separated from the latter so as to form an upwardly opening mouth between said bill and beard. The shank of the needle and the needle bar incline rearwardly from the upper end toward the lower end thereof and a reciprocating movement is imparted to these parts so that the hook and beard pass at intervals upwardly and downwardly through the central part of the rope of yarn at an angle to the path of the latter, such an upward and downward movement of the needle taking place for each binding operation of the machine. The needle bar for this purpose is preferably guided in an inclined way 83 arranged on the central part of the table and its upper movement is effected by means of a rotary cam 84 secured to the operating shaft and engaging with a tappet or pin 85 on the needle bar below said guideway and its downward movement is effected by a coil spring 23 connecting the lower end of the needle bar with the lower part of the main frame. The cam 84 is so constructed that the upper end of the needle is arranged below the path of the yarn rope while the same is being fed forward but during the first part of the operation of winding the binding thread about the yarn rope the upper end of the needle is raised sufficiently to cause the same to enter the yarn rope from the underside and project with the upwardly tapering upper side of its bill slightly above the top of the yarn rope and during the intermediate part of this binding operation the needle completes its upward stroke and projects its hook and beard above the yarn rope and during the last part of the operation the needle drops quickly so as to withdraw its upper end from the yarn rope and stand below the path of the latter preparatory to effecting the next forward step of this rope. The downward movement of the needle bar 80 is preferably arrested when its tappet 85 drops off the high part of the cam 84 by engaging the lower end of this bar with a stop 86 arranged on the main frame, as shown in Fig. 3, thereby relieving this cam from undue wear.

The tufting strands which together form the rope from which the individual tufts are formed are supplied from spools, bobbins or any other suitable source and conducted to the guide tube 40 within the winder in two groups. These two groups of tufting strands pass through a preliminary guide which is arranged immediately in rear of the winding device which preferably comprises upper and lower plates 88, 89 and a longitudinal upright partition or wall 90 arranged between these plates and forming with the latter two horizontal guideways 91, 92 which are arranged parallel and receive the two groups of tufting strands. As the tufting strand passes through these guideways the two groups are pressed against opposite sides of the partition between the two groups by means of leaf springs 93 each of which is arranged in one of the guideways and is mounted at its rear end by means of an upright screw or fastening 94 to the adjacent parts of the upper and lower guide plates while its free front end is held yieldingly in contact with the adjacent group of tufting strands by means of a vertical retaining pin 96 engaging with the outer side of the pressure spring and engaging with one of a plurality of pairs of coinciding openings 95, 97 formed in the upper and lower guide plates 88, 89. The several pairs of openings 95, 97 are arranged different distances from the partition 90 so that by placing the retaining pin 96 in one or the other of these pairs of openings the tension of the pressure spring may be varied to suit the number of strands of yarn which are employed in each group. The upper and lower plate and the longitudinal partition forming these two guideways are stationary and may be supported by means of a bracket 98 rising from the rear part of the table or in any other suitable way.

For the purpose of enabling the hook of the tucking needle to reliably engage with the binding thread or cord above the yarn rope preparatory to drawing a part of this thread in the form of a loop into the body of the rope, a thread deflector is provided which operates to push the two crossing parts of the binding thread above the rope forwardly out of the path of the needle hook. This deflector is preferably constructed in the form of a fork the prongs 99, 99 of which are arranged above the path of the rope in rear of the winder and below the retaining horns and each prong is provided on its upper side and in rear of its point or front end with a forwardly facing shoulder 100. This deflector fork is formed on the front end of a slide 101 which is guided in ways on the upper side of the top plate 88 of the guide so that it is capable of reciprocating horizontally and lengthwise of the yarn rope. This reciprocating movement may be produced by various means but preferably by the means which are shown in the drawings and which comprise a horizontal rock shaft 102 journaled transversely in bearings on the upper side of the table, an upper rock arm 103 projecting upwardly from the deflector rock shaft and provided at its upper end with a laterally projecting finger 104 which has the form of an upwardly projecting loop or fork 105 on the central part of the deflector slide, a lower rock arm 106 depending from the deflector rock shaft through an opening in the table, a cam disk 107 mounted on the operating shaft and provided with a cam pin 108 adapted to engage with the lower deflector arm 106 for moving the deflector forwardly, and a spring 109 which connects the lower arm 106 with the underside of the table and operates to shift the parts for moving the deflector fork rearwardly. The means for operating the deflector are so timed that the forward movement of the same is effected during the last part of the operation of winding the binding thread around the yarn rope preparatory to engaging the thread by means of the tucking needle and to retract the deflector into its rearmost position immediately after the hook of the tucking needle engages with the binding thread.

For the purpose of preventing the thread from creeping over the shoulders 100 and the prongs and getting on the rear parts of the same where the same would interfere with the proper working of the machine and possibly break the thread each of the prongs is provided immediately in rear of its shoulder 100 with an upwardly projecting lug 200 of such height that the thread under no circumstances can get backwardly over the same and onto the rear parts of the prongs.

In order to reliably connect the upper rock arm 103 with the shaft 102, the latter is provided on its upper side with an internally screw threaded socket 202 and the arm 102 is provided with an externally screw threaded lower end 203 which is firmly screwed into the socket and prevents disengagement as well as disarrangement of these parts.

The operating shaft is made in two sections 15, 150 in order to permit a part of the same to remain in the machine while the other may be easily removed to gain access to the interior parts of the machine, particularly those which are actuated by this shaft. For this purpose the front section 15 of this shaft which carries the gear wheel 20 and Geneva stop pinion 16 is journaled in bearings 151, 152 on one side of the main frame while the rear section 150 of the same which carries the cams 107, 84, 73 for operating the thread deflector, the needle supporting bar and the thread tensioning device, is detachably connected with the front section 15 and so mounted in the front that it can be easily removed therefrom without disturbing the front sections, thereby enabling the cams on this shaft section 150 to be adjusted and other repairs in the vicinity of the same to be effected without unduly dismantling the machine for this purpose.

As shown this is accomplished by arranging the front end of the front shaft section 15, outside of the frame and operatively connecting the same with the thread winding device while the rear end of this section is arranged within the frame, and arranging the rear shaft section 150 wholly within the frame and journaling the rear end of this rear shaft section 150 in a bearing 153 which is detachably secured to the main frame by bolts 154 and providing the opposing ends of the shaft sections 15, 150 with flanges 155, 156 which are detachably connected with each other by bolts 157, as shown in Figs. 1 and 11.

Upon referring to Figs. 1 and 2, it is clearly shown that the several gear wheels 9, 10, 11, 12, 14, 19, 20 and 22, Geneva stop pinion 16 and wheel 17 and pulley 24 are all arranged on the corresponding ends of the several shafts which carry them and on the same side of the machine which permits of operating these shafts with less friction, power and torque and insures greater accuracy in the timing of the several parts, as well as rendering these gears more accessible for inspection, adjustment and repairing.

In Figures 1, 2, 3, 4, 5 and 10, the parts are shown in the position which they occupy after an operation of winding the binding thread around the yarn rope has been completed, the rope has been fed forward a step, and a finished tuft has been cut off from the front end of this rope. During the forward movement of the strands of yarn they pass in two substantially equal groups forwardly along opposite sides of the longitudinal partition of the preliminary guide and come together in front of this partition so as to form one rope-like body before passing forwardly through the stationary guide tube 40 to the feed rollers and cutter mechanism. Immediately in front of the partition the two groups of cutting strands are separated slightly and form a gap between the same through which the tucking needle subsequently rises preparatory to forming the tucking loop in the thread as will be presently described. In the operation of the machine the binding thread is applied to one part of the rope and then wound around the next following part of the rope, this operation being repeated continuously and a plurality of such binding threads being applied to successive parts of the rope so that this thread extends continuously from one winding to the next, as shown in Fig. 20, and a plurality of tufts are bound together while the same still forms a part of the rope and before the latter reaches the cutting mechanism.

When the machine is first started the front end of the thread may be tied or otherwise secured to the rope of yarn but after the machine is in operation the thread is held on the rope at each binding ready to be applied to the next following portion thereof.

Figure 14:
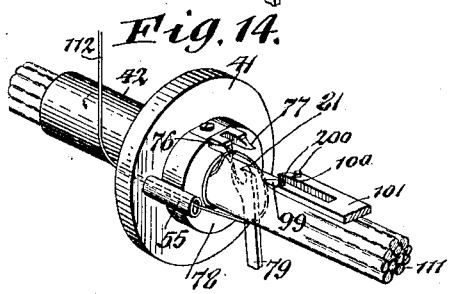

In producing a binding of thread or cord around the rope of tufting yarn the thread winder makes approximately two and a half rotations in one direction. Assuming that the machine starts from the position of the parts shown in Figs. 1, 2, 3, 4, 5 and 13 the winder during its first complete rotation lays the thread by means of its eye over the retaining horn 76 which is nearest to the point at which the eye of the winder is located. When beginning this rotation and while making this turn the eye winds the thread once around the rope of yarn, as shown in Fig. 14. At the same time the tucking needle is raised so that the same passes upwardly to the central part of the rope and comes to rest with the tapering upper part of its hook or bill projecting slightly above the top of the rope and in such position that the upper part of the first turn of the thread is arranged in front of the hook and the lower part of this first turn of the thread is also arranged in front of the needle, as shown in Fig. 14.

As the thread is wound over the retaining horn 76 and around the yarn rope by the winding eye during the first rotation of the latter that part of the binding thread extending from the horn 76 to the periphery of the rope is arranged tangentially relatively to the latter, as shown in Fig. 14. The winding of the upper part of the first turn of the thread over the retaining horn and in front of the needle in the rope is due to the front end of the thread being carried with the rope into the guide tube 40 so that the front end of this section or part of the thread inclines from the rope to the eye of the winder, as shown in Fig. 2, and is thus intercepted by the retaining horn 76 and is also caused to wind around the yarn rope in front of the hook of the needle due to this inclination of the front part of the thread from the guide tube 40 to the rear end of the eye of the winder.

Figure 15:
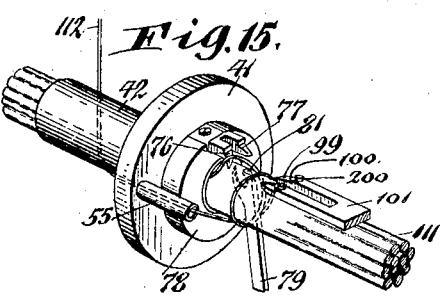

As the winder makes its second complete rotation about the yarn rope the thread is wound over the top of the rope in rear of the hook of the needle by reason of the fact that the beginning of the winding of this thread begins on the underside of the rope at a point substantially in alinement transversely with the rear end of the winding eye aided by the bevelled rear side of the needle hook which tends to deflect the thread engaging with the same toward the upper side of the rope in rear of this hook, but the lower part of the second turn of this thread is again applied to the underside of the rope in front of the needle owing to the inclination of the shank of the needle relatively to the plane of rotation of the rear end of the winding eye. This second winding of the binding thread around the rope is indicated in Fig. 15.

Figure 17:
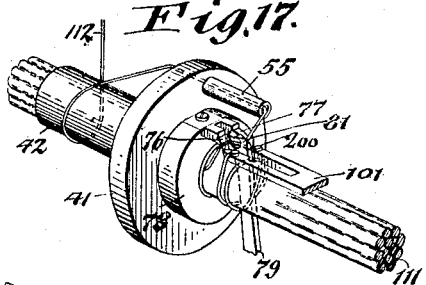
Figure 16:
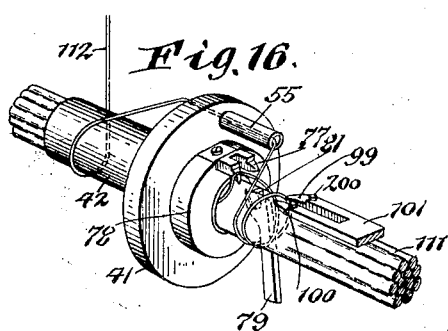

As the winder effects the next quarter of a rotation the eye thereof carries the thread partly over the upper side of the rope and tangentially across and in rear of that part of the thread which extends from the horn 76 to the periphery of the yarn rope but at an opposite angle thereto, as shown in Fig. 16. When the winder reaches this position and has wound the thread about the yarn so that the tangential end portions thereof cross each other above the yarn rope the deflector moves forwardly and engages the shoulders of its prongs with the two tangential parts of the thread below the point of intersection between the same and pushes the same forwardly to a point in front of the hook of the needle and immediately thereafter the needle completes the second half of its upward movement and causes its hook to engage over the front tangential part of the thread above its point of crossing with the rear tangential part thereof, as shown in Fig. 17.

Figure 18:
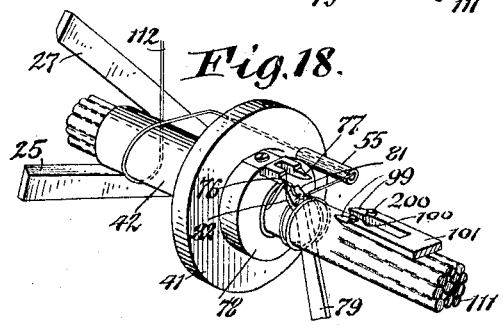
Figure 19:
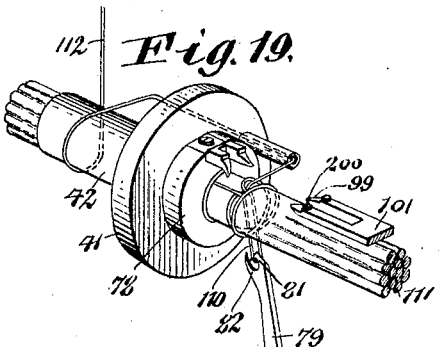

The instant the hook of the needle is thus engaged with the front tangential part of the binding thread the deflector is retracted into its rearward position, as shown in Fig. 18, and the needle moves downwardly through the yarn rope into its lowermost position in which it stands below the path of the rope, whereby that part of the thread extending upwardly from the guide tube 40 to the retaining horn 76 and from the latter tangentially to the periphery of the yarn rope is pulled by the hook of the needle from the horn and drawn in the form of a loop 110 downwardly through the central part of the yarn rope and between the rear tangential part of the thread and the upper part of the second winding, as shown in Fig. 19. After the hook of the needle has engaged with the front part of the thread above the rope of yarn and while the hook of the needle pulls this part of the thread downwardly through the yarn rope the eye of the winder completes the last quarter of its rotation in one direction, as shown in Figs. 18 and 19.

At the same time that the needle is effecting its downward stroke and carrying the loop of binding thread downwardly through the rope the latter is moved forwardly one step by the feeding rolls whereby the angle of the loop of thread engaged by the needle is increased and this loop is caused to slip off from the hook of the latter as the loop moves forwardly with the rope. During such forward movement of the rope the lower turn of the loop 110 is also withdrawn into the body or between the strands of the yarn rope and concealed thereby owing to the frictional resistance encountered by the unused part of the thread in passing through the various parts which support the same, such as the guides 57, 59, 61 and 67. As the needle draws the loop of thread downwardly through the yarn rope no additional thread is withdrawn from the supply bobbin or spool 56 for this purpose inasmuch as that portion of the thread extending from the guide tube 40 to the horn 76 and from the latter to the periphery of the yarn rope supplies the necessary slack or surplus thread for forming the tucking loop; when this part of the thread slips off from the horn 76. During the forward movement of the rope the resistance which the needle offers to the tucking loop previous to the detachment of the latter from the tucking loop causes the binding thread to be tightened about the rope of yarn strands so that the latter are securely united by frictional engagement of the windings of thread about the strands and the loop thereof which is tucked in between the strands of the rope.

As the rope of yarn is moved forwardly its front end is passed between the blades of the cutter and at the end of this forward movement the cutter severs the foremost section of the bound rope and completes a tuft which drops away by gravity and at the same time the binding devices effect another cycle of operations for tying another binding thread around the yarn rope.

When the binder completes its rotation in one direction it stands in a position relatively to the yarn rope diametrically opposite to where it commenced its rotation preparatory to completing the winding operation for the next tuft.

During the next following reverse rotation of the winder the latter winds the binding thread in a reverse direction around the yarn rope and also around the other previously inactive retaining horn 77 while the previously active horn 76 is idle. In other respects the operations for producing the next binding around the yarn is the same as that previously described.

During every two and a half rotations of the winder in one direction part of the thread is wound on the hub of the winder and during the next following rotation of the winder in the opposite direction the thread so wound upon its hub is unwound therefrom and again partly wound thereon in the reverse direction, thereby taking care of the thread in front of the winder during the rotary movement of the same and preventing snarling thereof without employing any special means for this purpose.

I claim as my invention:

1. In a machine of the character described, a pair of co-operating feed rollers, a removable driven gear wheel operatively and detachably connected with one of said rollers, a driving gear wheel, a pair of intermediate gear wheels which mesh with each other and also mesh respectively with said driving and driven gear wheels, a vertically swinging supporting arm which carries said intermediate gear wheels and which is pivoted concentrically with said driving gear wheel and is provided with a slot curved concentrically with the pivot of said arm, and a clamping screw passing through the slot and into a stationary support.

2. In a machine of the character described, a main frame, a yarn rope feed mechanism having a shaft journaled on said frame, an intermediate shaft journaled in said main frame, gearing operatively connecting said intermediate shaft with the shaft of said feed mechanism, a continuously rotating main shaft journaled on the main frame, a Geneva stop mechanism for transmitting intermittent rotary motion from said main shaft to said intermittently rotating shaft, a counter shaft journaled in the main frame, gearing connecting said counter shaft and main shaft, a driving shaft journaled on the main frame, gearing connecting said driving shaft and counter shaft, and a driving pulley mounted on said driving shaft, said gearing, Geneva stop wheel and pinion and pulley being arranged on the corresponding ends of said shafts on the same side of said frame.

3. In a machine of the character described, means for feeding a yarn rope, a device for winding a thread around said rope, a needle for tucking a part of said thread in the yarn rope, a reciprocating upright bar carrying said needle at its upper end, a rotary cam for elevating said bar, a spring for depressing said bar, and a fixed stop which is engaged by the lower end of said bar for limiting the downward movement of the same.

4. In a machine of the character described, a frame, a thread winding device, a thread tension device, a needle mechanism, a thread deflector, and a shaft having a front section journaled on the main frame and operatively connected with the thread winding mechanism, and a rear section detachably connected with said front section and operatively connected with said thread tension device, needle mechanism and thread deflector.

5. In a machine of the character described, a frame, a thread winding device, a thread tension device, a needle mechanism, a thread deflector, a shaft having a front section which is journaled in bearings on the frame and has its front end arranged outside of the frame and operatively connected with said winding mechanism while its rear end is arranged on the inner side of the frame, and a rear section which is arranged wholly within the frame and journaled in bearings thereon, means for operating said thread tension device, needle mechanism and thread deflector including cams arranged on said rear shaft section, flanges arranged on the opposing ends of said shaft sections, and bolts connecting said flanges.

WILSON M. PETTIT.